Patented Jan. 10, 1950

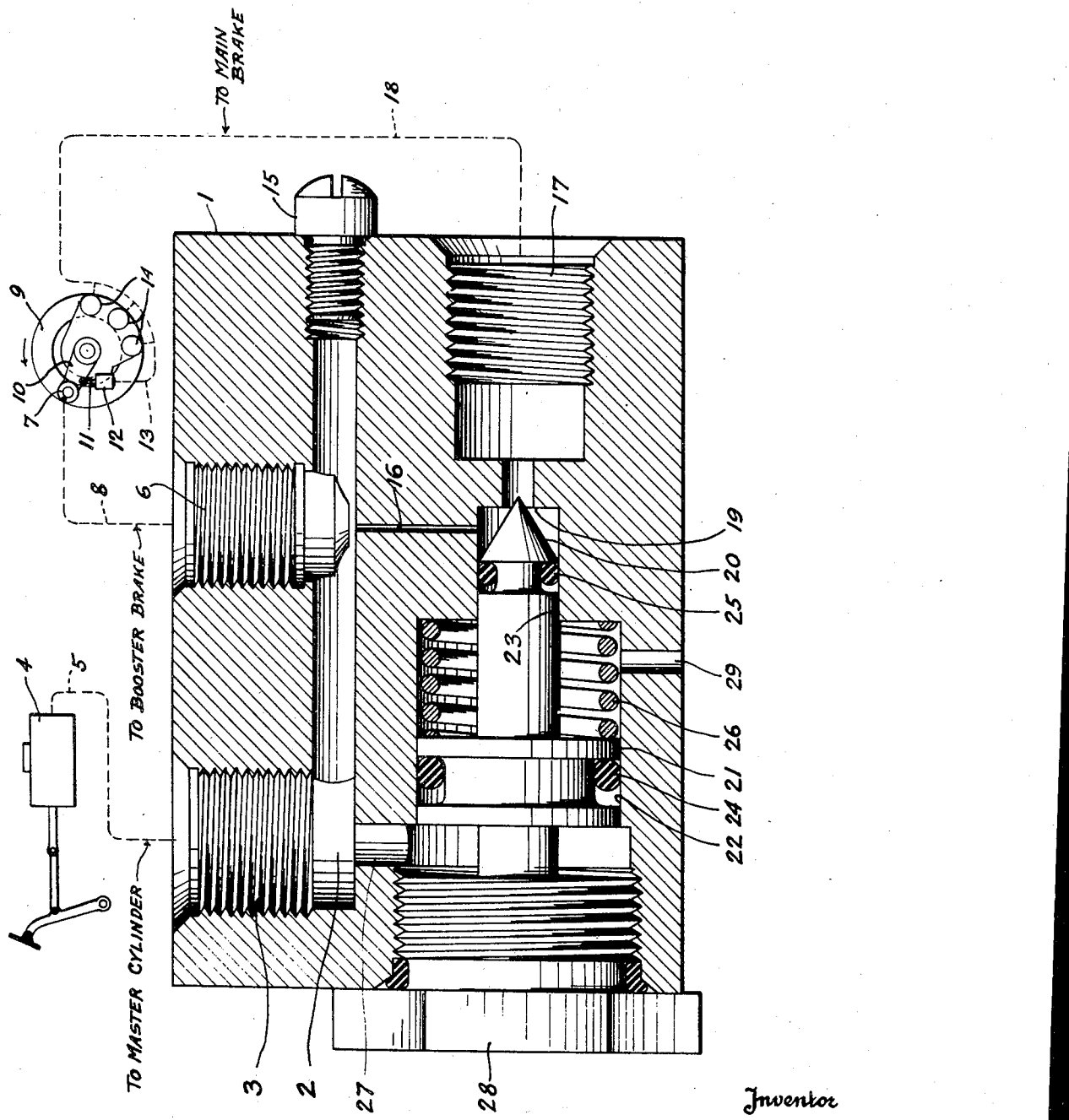

2,494,319

UNITED STATES PATENT OFFICE 2,494,319

BOOSTER BRAKE SYSTEM

Fillmore D. Swan, Akron, Ohio, assignor to Wingfoot Corporation, Akron, Ohio, a corporation of Delaware Application October 9, 1947, Serial No. 778,949

6 Claims. (Cl. 188—141)

This invention relates to a booster brake system and to a check valve associated therewith.

Heretofore, valves and check valves of various kinds and adapted to a wide variety of uses have been provided, but no known check valve or valves have been adapted for use with a booster brake system to facilitate escape of air from and replenishment of fluid in the brake unit of the system.

It is the general object of the invention to provide a relatively inexpensive, easily installed check valve, particularly adapted to be associated with a booster brake system, the valve serving to automatically replenish braking fluid in the brake unit and to allow the escape of air from the brake unit back to the master cylinder unit.

Another object of the invention is the provision of a valve of the character described and characterized by light weight, simplicity of construction, minimum of parts, and by foolproof operation over long periods of time without attention or repair.

Another object of the invention is to provide a booster brake system characterized by an automatically operating check valve to insure the presence of an adequate amount of brake operating fluid in the brake cylinder at all times, and as supplied from the master cylinder of the system.

The foregoing objects of the invention, and other objects which will become apparent as the description proceeds, are achieved by a booster brake system including a master cylinder, a booster brake operated by the master cylinder, a booster unit operated by the booster brake and wheel torque, a brake operated by the booster unit, said system being characterized by a check valve, the check valve having a passage freely connecting the master cylinder and the booster brake, a relatively small cross section by-pass extending from the passage and connected to the brake, a valve in the by-pass, resilient means normally urging the valve to open position, a piston on the valve, and a connection from behind the piston to the passage whereby fluid under pressure in the passage will move the piston to close the valve.

For a better understanding of the invention, reference should be had to the accompanying drawing, wherein the single figure illustrates in a longitudinal sectional view a valve incorporating the principles of the invention, and the same figure of the drawing diagrammatically includes the other elements and conduits of a typical booster brake assembly.

Having reference to the drawings, the numeral 1 indicates a valve body having a passage 2 therein, the passage 2 terminating at one end in a tapped opening 3 or other means adapted to be connected to a conduit extending to the master cylinder of a booster brake assembly. In the drawing, the diagrammatically illustrated master cylinder is indicated by the numeral 4, and the diagrammatically illustrated conduit by the numeral 5. The passage 2 is connected, also, to a tapped opening 6, or other means adapted to effect connection with a conduit running to a booster brake. In the drawings, the booster brake and conduit have been diagrammatically illustrated, and are indicated respectively by the numerals 7 and 8.

It will be understood that the booster brake assembly includes a rotary brake disc or drum 9, an arcuately movable arm 10 pivotally supported for swinging movement about substantially the axis of the brake disc or drum, and with the arm 10 carrying at its end the booster brake 7. When the booster brake unit 7 is actuated by fluid pressure supplied thereto from the master cylinder 4, the booster brake 7 will frictionally grip the brake disc or drum 9. Inasmuch as this drum is turning in the direction shown by the arrow, it will carry the arm 10 through a partial arc to move a piston rod 11 of a booster cylinder 12, the piston rod 11 being pivotally connected to the arm 10. Movement of the piston rod 11 and its associated piston into the booster cylinder or unit 12 will supply fluid under high pressure through a conduit 13 to a brake assembly which may include one or more pressure cylinders 14 which likewise frictionally engage with the brake disc or drum 9.

Returning to the valve 1, it will be recognized that the end of the passage 2 at the right hand side of the valve is closed by a screw 15.

Associated with the passage 2 is a by-pass 16 in the body of the valve, the by-pass terminating in a tapped opening 17 or other means adapted to be connected to a conduit, such a conduit being diagrammatically shown and indicated by the numeral 18 and extending to the brake cylinders 14. The by-pass 16 is formed with a valve seat 19. A conical plug 20 is adapted to cooperate with the seat 19, the plug having a piston 21 connected thereto. Suitable sealing means are provided between the piston and a cylindrical bore 22 within which it slides, and between the conical plug 20 and a reduced diameter bore 23 within which it slides. Such sealing means may take a variety of forms, but one convenient and inexpensive construction is to employ rubber O-rings 24 and 25 which are rockably received in grooves of slightly greater width than the O-rings formed in the piston and plug respectively.

The valve plug 20 is normally resiliently urged away from the valve seat 19, and this can be conveniently accomplished by means of a coiled compression spring 26 which engages against the piston 21.

In order to close the valve in the by-pass 16, a passage way or connection 27 is provided between the passage 2 and the backside of the piston 21, so that when there is fluid under pressure in the passage 2 it will engage with the piston 21 to move the piston and valve plug to the right to engage the conical plug 20 with the valve seat 19.

A screwed-in closure plug 28 completes the assembly, it being understood that both with respect to the closure screw 15 and the closure plug 28 that the holes or bores are made first by suitable drills and then the end of the holes or bores are appropriately tapped to receive the closure screws or plugs, all in accord with known engineering practices.

It is believed that the operation of the improved valve of the invention will be understood from the foregoing description. Suffice it to say here that when the master cylinder 4 is operated to supply fluid under pressure to the booster brake 7, that fluid under pressure behind the piston 21 will move the piston and valve plug to the right to close the by-pass 16. However, when the pressure on the master cylinder 4 is released and the pressure drops in the passage 2 and behind the piston 21, the coiled compression spring 26 will move the piston and the valve plug to the left to open up the by-pass 16 which extends, in effect, from the master cylinder to the brake cylinders 14. Accordingly, at this time, that is, during the non-operation of the booster brake assembly, any air in the brake units 14 will flow back to the master cylinder, and at the same time, if there is any shortage of fluid in the brake cylinders 14, extra fluid from the master cylinder will flow to the brake cylinders 14 and to the booster unit cylinder 12. It will be understood that a gravity flow of this type is made possible by the master cylinder 4 being positioned highest in the system and the brake cylinders 14 lowest in the system, and with the valve 1 being positioned at an intermediate position. A release port 29 is formed in the body of the valve 1 so that any fluid which might get by the sealing means into the chamber containing the spring 26 can escape to the atmosphere.

From the foregoing, it will be recognized that the various objects of the invention have been achieved by the provision of an improved valve for use in conjunction with booster brake systems and the like, the valve being characterized by simplicity, ease of installation, long life without attention or repair, and serving to replenish fluid in the brake cylinders from the master cylinder, but shutting off the flow of fluid therebetween upon the application of the brake.

While in accord with the patent statutes one best known embodiment of the invention has been illustrated and described in detail, it is to be particularly understood that the invention is not to be limited thereto or thereby, but that the scope of the invention is defined in the appended claims.

What is claimed is:
1. A booster brake system including a master cylinder, a booster brake operated by the master cylinder, a booster unit operated by the booster brake and wheel torque, a brake operated by the booster unit, said system being characterized by a check valve, the check valve having a passage freely connecting the master cylinder and booster brake, a relatively small cross-section by-pass from the passage connected to the brake, a valve in the by-pass, resilient means normally urging the valve to open position, a piston on the valve, and a connection from behind the piston to the passage whereby fluid under pressure in the passage will move the piston to close the valve.

2. A booster brake system including a master cylinder, a booster brake operated by the master cylinder, a booster unit operated by the booster brake, a brake operated by the booster unit, said system being characterized by a check valve, the check valve having a passage freely connecting the master cylinder and booster brake, a by-pass from the passage connected to the brake, a valve in the by-pass, means normally urging the valve to open position, a piston on the valve, and a connection from behind the piston to the passage whereby fluid under pressure in the passage will move the piston to close the valve.

3. A booster brake system including a master cylinder, a booster brake operated by the master cylinder, a booster unit operated by the booster brake and wheel torque, a brake operated by the booster unit, said system being characterized by a check valve, the check valve having a passage freely connecting the master cylinder and booster brake, a relatively small cross-section by-pass from the passage connected to the brake, a valve in the by-pass, resilient means normally urging the valve to open position, and a connection from behind the valve to the passage whereby fluid under pressure in the passage will close the valve.

4. A booster brake system including a master cylinder, a booster brake operated by the master cylinder, a booster unit operated by the booster brake, a brake operated by the booster unit, said system being characterized by a check valve, the check valve having a passage freely connecting the master cylinder and booster brake, a by-pass from the passage connected to the brake, a valve in the by-pass, means normally urging the valve to open position, and a connection from behind the valve to the passage whereby fluid under pressure in the passage will close the valve.

5. A booster brake system including a check valve, the check valve having a passage freely connecting the master cylinder and booster brake, a relatively small cross-section by-pass from the passage connected to the brake, a valve in the by-pass, resilient means normally urging the valve to open position, a piston on the valve, and a connection from behind the piston to the passage whereby fluid under pressure in the passage will move the piston to close the valve.

6. A booster brake system including a check valve, the check valve having a passage freely connecting the master cylinder and booster brake, a by-pass from the passage connected to the brake, a valve in the by-pass, means normally urging the valve to open position, a piston on the valve, and a connection from behind the piston to the passage whereby fluid under pressure in the passage will move the piston to close the valve.

FILLMORE D. SWAN.

REFERENCES CITED

The following references are of record in the file of this patent:

UNITED STATES PATENTS

| Number | Name | Date |
|---|---|---|
| 1,855,504 | White | Apr. 26, 1932 |
| 2,075,176 | Clarke | Mar. 30, 1937 |
| 2,189,224 | Roberts | Feb. 6, 1940 |
| 2,208,820 | Tarris | July 23, 1940 |
| 2,289,145 | Saives | July 7, 1942 |
| 2,293,068 | McLaughlin | Aug. 18, 1942 |
| 2,402,115 | Levy | June 11, 1946 |